(12) United States Patent
Paluszek et al.

(10) Patent No.: US 12,600,501 B2
(45) Date of Patent: Apr. 14, 2026

(54) MOBILE ROBOTIC ARM FOR MOMENTUM UNLOADING AND ORBIT CONTROL

(71) Applicant: PRINCETON SATELLITE SYSTEMS, INC., Plainsboro, NJ (US)

(72) Inventors: Michael Paluszek, Plainsboro, NJ (US); Stephanie Thomas, Plainsboro, NJ (US); Christopher Galea, Plainsboro, NJ (US)

(73) Assignee: PRINCETON SATELLITE SYSTEMS, INC., Plainsboro, NJ (US)

( * ) Notice: Subject to any disclaimer, the term of this patent is extended or adjusted under 35 U.S.C. 154(b) by 190 days.

(21) Appl. No.: 18/375,216

(22) Filed: Sep. 29, 2023

(65) Prior Publication Data

US 2025/0108940 A1 Apr. 3, 2025

Related U.S. Application Data

(60) Provisional application No. 63/411,350, filed on Sep. 29, 2022.

(51) Int. Cl.
B64G 4/00 (2006.01)
B64G 1/40 (2006.01)

(52) U.S. Cl.
CPC ............... B64G 4/00 (2013.01); B64G 1/407 (2013.01); B64G 2004/005 (2013.01)

(58) Field of Classification Search
CPC .... B64G 4/00; B64G 1/407; B64G 2004/005; B64G 1/242; B64G 1/244; B64G 1/44
See application file for complete search history.

(56) References Cited

U.S. PATENT DOCUMENTS

| | | | | |
|---|---|---|---|---|
| 2002/0104927 A1* | 8/2002 | Pedreiro | ................. | F16F 15/03 |
| | | | | 244/173.2 |
| 2007/0007393 A1* | 1/2007 | Pinto | ..................... | B64G 1/417 |
| | | | | 244/171.5 |
| 2013/0000632 A1* | 1/2013 | Lundahl | .................. | F24S 25/10 |
| | | | | 126/574 |
| 2016/0214742 A1* | 7/2016 | Carroll | ............... | G01C 21/1656 |
| 2019/0238216 A1* | 8/2019 | Avellan | ............. | H04B 7/18534 |
| 2019/0286168 A1* | 9/2019 | Weiss | ........................ | B64G 1/244 |
| 2022/0048650 A1* | 2/2022 | Rey | ........................... | B64G 4/00 |
| 2022/0297859 A1* | 9/2022 | Turner | ................ | B25J 15/0433 |
| 2022/0373695 A1* | 11/2022 | Rautalin | ................. | G01S 19/07 |

* cited by examiner

*Primary Examiner* — Donald J Wallace
*Assistant Examiner* — Jalal C Coduroglu
(74) *Attorney, Agent, or Firm* — Volpe Koenig

(57) ABSTRACT

Embodiments of the present invention implement a method, apparatus, and computer-readable medium for the use of a robotic arm for momentum unloading and orbit control. In some instances, a panel is attached to the end of a robotic arm. It is positioned, in angle and position, to optimize unloading. The robot arm can move about the spacecraft, giving additional degrees of freedom. The panel can be stowed when necessary.

20 Claims, 4 Drawing Sheets

100

300

400

402    Compute Force/ Torque

404    Compute Solar Force

406    Determine Angles

408    Control Arm

MOBILE ROBOTIC ARM FOR MOMENTUM UNLOADING AND ORBIT CONTROL

CROSS-REFERENCE TO RELATED APPLICATION

This application claims the benefit of 64/411,350 entitled "MOBILE ROBOTIC ARM FOR MOMENTUM UNLOADING AND ORBIT CONTROL," filed on Sep. 29, 2022, which is incorporated by reference as if fully set forth.

TECHNICAL FIELD

The technical field generally relates to spacecraft and, more specifically, to systems and methods for the control of robotic arms implemented on spacecraft.

BACKGROUND OF THE INVENTION

Momentum unloading refers to a process commonly used in spacecraft and satellite control systems to manage the build-up of momentum in momentum storage devices or reaction wheels, which are used to control the orientation of the spacecraft without using thrusters. Over time, due to external torques such as those from solar radiation pressure or gravitational pulls, the momentum stored in these wheels can build up, and if left unmanaged, it can saturate the wheels, preventing further attitude control adjustments.

Momentum unloading is initiated to reset the accumulated momentum to a desirable range, utilizing a variety of methods. One such method is Thruster Firing, where thrusters are activated to counterbalance the stored momentum, effectively transferring the momentum from the wheels to the spacecraft, which is then expelled through the thrusters. This is a straightforward method to unload momentum, albeit at the cost of using propellant. Another method employs Magnetic Torquers or Torque Rods, which generate magnetic fields that interact with Earth's magnetic field to create torques on the spacecraft. Through meticulous control of these torques, momentum can be transferred from the wheels to the spacecraft and subsequently to Earth's magnetic field, unloading the momentum without the need for propellants.

Alternatively, Control Moment Gyros (CMGs) can be employed in spacecraft equipped with these systems, enabling the transfer of momentum between the wheels and the spacecraft. This method facilitates precise control over the spacecraft's orientation while managing the momentum conserved in the wheels. In another method, a Gravity-Gradient Boom is extended from the spacecraft, and the variance in gravitational pull along the length of the boom generates a torque that can be used to unload momentum from the wheels. The selection of a specific method for momentum unloading is determined by the spacecraft design, the mission requirements, and other operational considerations.

Spacecraft frequently come equipped with reaction wheels, facilitating the transfer of momentum between the wheels and the spacecraft body. This transfer enables precise control over the spacecraft's attitude. However, over time, as the reaction wheels counteract disturbance torques imposed on the spacecraft, excess momentum may accumulate in them. Consequently, it becomes essential to routinely unload the excess momentum accumulated in the reaction wheels to prevent saturation and preserve attitude control.

Robotic arms in spacecraft are integral for a myriad of tasks and missions conducted beyond Earth's atmosphere.

They serve crucial functions such as Manipulation and Capture, where they aid in capturing, docking, or berthing other spacecraft, satellites, or cargo by grappling objects in space and either relocating them or securing them to the spacecraft. Additionally, they play a pivotal role in Assembly and Construction, particularly witnessed in the construction of the International Space Station (ISS), where they handle and assemble large and heavy components with remarkable precision. Moreover, they extend their utility to Maintenance and Repair tasks on the spacecraft or other space entities by carrying essential tools and replacement parts, thereby eliminating the necessity for extravehicular activities by astronauts. Their contribution to Scientific Exploration is also notable as they collect samples, deploy scientific instruments, and interact with other planets or celestial bodies' environments.

In Observation and Inspection, robotic arms outfitted with cameras and sensors are extended to scrutinize areas of the spacecraft that are challenging to access or to closely examine nearby space objects. They also excel in Payload Handling, efficiently moving payloads from storage compartments to required locations or positioning them correctly for deployment. The Enhanced Autonomy of advanced robotic arms showcases their ability to execute tasks with minimal human intervention, a trait beneficial in deep-space missions where communication experiences time delays. Additionally, the Teleoperation feature enables astronauts or ground control to remotely perform delicate and complex operations through these robotic arms. Examples such as the Canadarm2 on the ISS or the robotic arm on Mars Rovers illustrate how this technology significantly augments the scope of human space exploration and operations, paving the way for more intricate and far-reaching missions.

SUMMARY OF THE INVENTION

Embodiments of the present invention implement a method, apparatus, and computer-readable medium for the use of a robotic arm for momentum unloading and orbit control. In some instances, a panel is attached to the end of a robotic arm. It is positioned, in angle and position, to optimize unloading. The robot arm can move about the spacecraft, giving additional degrees of freedom. The panel can be stowed when necessary.

BRIEF DESCRIPTION OF THE DRAWINGS

A more detailed understanding can be obtained from the following description, given by way of example in conjunction with the accompanying drawings wherein.

DETAILED DESCRIPTION OF THE PREFERRED EMBODIMENTS

Figure 1:
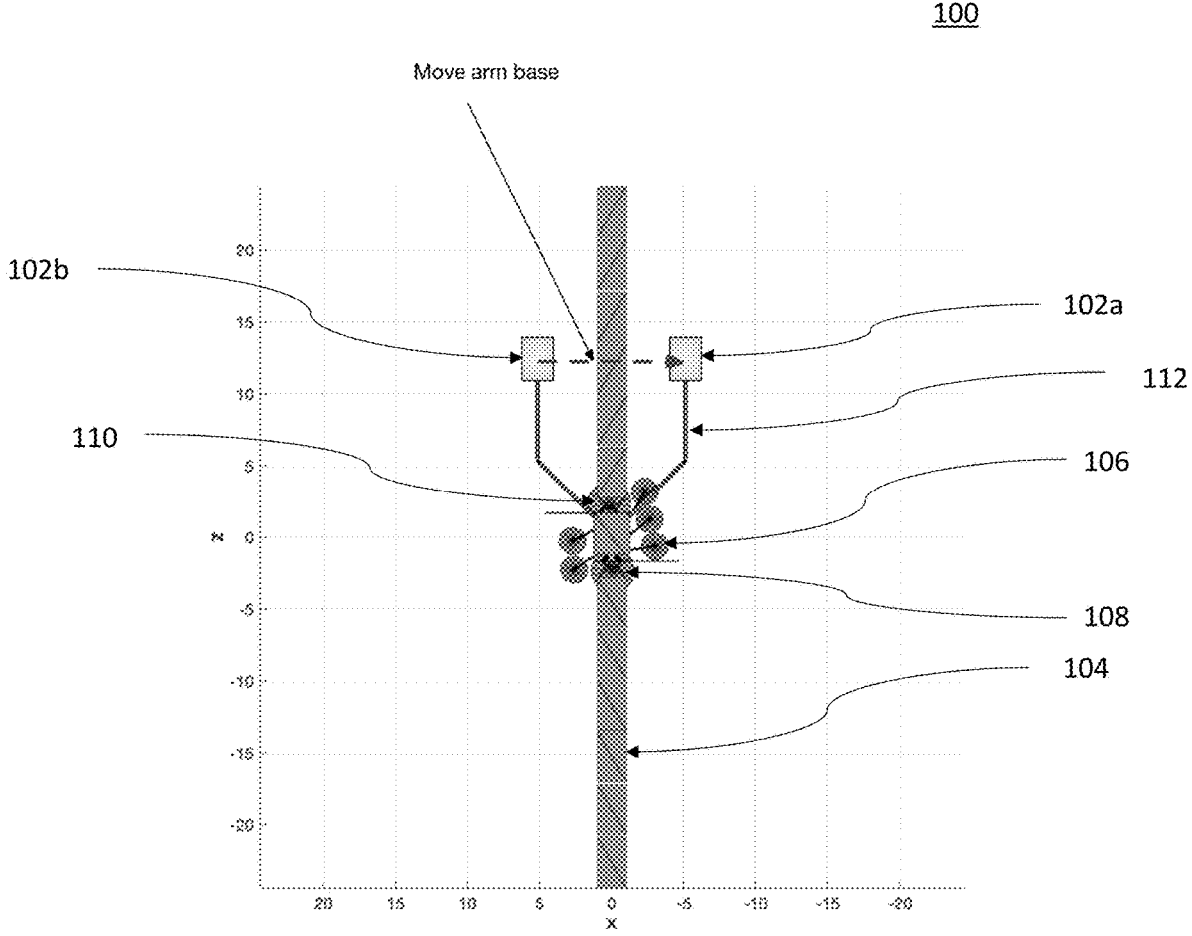
FIG. 1 illustrates an example mobile robotic arm for momentum unloading, shown on a commercial communications satellite.

Thrusters are pivotal components on spacecraft, tasked with providing propulsion and ensuring accurate maneuvering in the vacuum of space, where traditional engines cannot operate due to the absence of an atmosphere to push against.

There are several types of thrusters, each with its unique mechanism and application. Chemical thrusters, the most common type, utilize chemical reactions to produce a high-speed stream of gas, which, when expelled, creates thrust according to Newton's third law. Electric or ion thrusters, on the other hand, use electricity to ionize a propellant like xenon, and then employ magnetic or electric fields to expel the ions at high speeds to generate thrust. Furthermore, nuclear thermal thrusters use a nuclear reactor to heat a propellant that then expands and is expelled to create thrust, while cold gas thrusters release compressed gas to create thrust, marking them as a simpler yet less efficient type of thruster.

The functionalities of thrusters in a spacecraft are multiple. They serve as the primary means of propulsion, helping a spacecraft change its orbit, decelerate, or accelerate as required. Thrusters are essential for attitude control, a critical aspect that entails adjusting the spacecraft's orientation; short bursts from thrusters can help in rotating the spacecraft or keeping it stable. Additionally, in the case of satellites, thrusters play a vital role in station-keeping to ensure the satellite remains in its designated orbit despite gravitational perturbations and other forces that might try to nudge it off course.

Performance metrics are vital in assessing the effectiveness and efficiency of thrusters. The primary metrics include thrust, which is the amount of force a thruster can provide; specific impulse (Isp), a measure of how efficiently a thruster uses propellant, expressed in seconds; total impulse, which is the product of thrust and the duration over which the thrust is applied; and efficiency, defined as the ratio of the kinetic energy imparted to the propellant to the energy used by the thruster.

Magnetic torquers, also known as magnetorquers or torque rods, are pivotal devices employed in spacecraft for the purpose of attitude control and adjustment, operating without the need to expel mass. The primary working principle of magnetic torquers is to generate controlled magnetic fields by allowing electric current to flow through a coil or a rod. This generated magnetic field interacts with Earth's magnetic field, leading to the production of torques that can alter the spacecraft's orientation. By modifying the magnitude and direction of the electric current flowing through the torquer, the magnitude and direction of the torque can be effectively controlled. This electromagnetic induction-based mechanism provides a precise method to manipulate the orientation of a spacecraft.

There are several types of magnetic torquers, each with unique characteristics. Rod torquers consist of a rod around which a coil is wound, and upon passing current through the coil, a magnetic field is generated. They are known for their high magnetic moments and substantial torque generation. On the other hand, coil torquers, with coils wound in a loop mounted on a frame, are typically lighter and can be more efficient, albeit might generate lesser torque compared to rod torquers. Yoke torquers are akin to coil torquers but feature a magnetic yoke to enhance the magnetic field, and as a result, the torque produced. These different types cater to various requirements in spacecraft, making the magnetic torquing system versatile and adaptable to diverse space mission needs.

The applications of magnetic torquers are wide-ranging within spacecraft operations. They are instrumental in attitude control to maintain or change the orientation of a spacecraft, aiding in fine-tuning the spacecraft's position or ensuring stability. Additionally, they are used in detumbling processes, where any residual rotational motion post-launch is rectified. Moreover, magnetic torquers assist in the desaturation of reaction wheels or momentum wheels, which are conventional attitude control devices. When these wheels become saturated, magnetic torquers help transfer the angular momentum to Earth's magnetic field, thereby aiding in the precise control of spacecraft orientation. The propellant-less operation of magnetic torquers marks them as invaluable assets for long-duration missions, especially where carrying extra propellant for traditional thrusters could be impractical or excessively burdensome.

Solar sails, alternatively known as light sails or photon sails, embody a unique form of spacecraft propulsion, relying on the radiation pressure exerted by sunlight on expansive mirrors. An example of a solar sail is described in APPARATUS AND METHODS FOR SPACECRAFT ATTITUDE CONTROL USING A SOLAR SAIL, US 2022/0048650 A1, Daniel Rey et al., Feb. 17, 2022, which is hereby incorporated by reference and included in this filing.

Operating on the principle of momentum transfer, solar sails are propelled as photons from the Sun strike and transfer momentum to them, much akin to wind propelling a sailboat. The force from the photons is gentle, yet continuous, gradually accumulating over time, which, in the vacuum of space, can lead to achieving significant velocities. Structurally, a solar sail comprises a reflective material stretched over a framework. Commonly, the reflective material is a thin, lightweight, and highly reflective metallic film like aluminum or mylar, while the framework is often made of sturdy, lightweight materials such as carbon fiber. This design contributes to fuel efficiency, a notable advantage of solar sails, as they require no fuel, substantially reducing mission costs and facilitating long-duration missions.

The continuous, albeit gentle, acceleration from sunlight sets solar sails apart from conventional rocket propulsion that offers thrust only for a brief period; this continuous acceleration can result in higher final speeds over extended periods. However, the gentle force renders the acceleration slow, and coupled with the reliance on sunlight, the effectiveness of solar sails diminishes as the distance from the Sun increases, rendering them less suitable for missions beyond the solar system unless combined with other propulsion methods. The envisioned applications of solar sails are vast, ranging from interplanetary travel, spacecraft station-keeping, and asteroid deflection, to potentially propelling spacecraft to other star systems when paired with additional propulsion methods like onboard lasers. The viability of solar sails has been showcased in missions such as Japan's IKAROS (Interplanetary Kite-craft Accelerated by Radiation Of the Sun) and NASA's NEA Scout mission.

Solar pressure, often referred to as radiation pressure, is the pressure exerted by electromagnetic radiation on any surface it encounters. In the case of sunlight, it consists of photons, which are massless particles that carry momentum. When these photons collide with a surface, they transfer their momentum to it, generating a force. Despite the individual force from a single photon being minuscule, the cumulative effect of countless photons striking a surface can produce a noticeable force, especially in the vacuum of space where there's no atmospheric drag to counteract it. In a practical context, solar pressure is harnessed in space propulsion technologies like solar sails. Over time, the continuous force exerted by solar radiation can accelerate a spacecraft to substantial speeds, making solar pressure a viable mechanism for long-duration space exploration missions.

Solar drag arises from the interaction between solar radiation and a spacecraft, notably affecting those with extended structures such as solar panels or antennae. This interaction is driven by solar radiation pressure, which results from the Sun's electromagnetic radiation—spanning visible light, ultraviolet, and infrared radiation—impinging on a surface. As photons from the Sun strike a surface, their momentum is transferred to it, creating a force analogous to solar radiation pressure. While this force is akin to aerodynamic drag within Earth's atmosphere, it operates to a lesser degree in the vacuum of space. The effect of solar radiation pressure is significantly pronounced on spacecraft with larger exposed surface areas, whereby the drag force experienced is greater, potentially impacting the spacecraft's trajectory and orientation.

The temperature effects stemming from solar radiation also contribute to solar drag. As solar panels or other extended structures absorb solar radiation, they heat up and may outgas, creating a modest thrust that can alter the spacecraft's trajectory. To curb the effects of solar drag, aerospace engineers may opt for materials that reflect rather than absorb solar radiation, reduce the surface area exposed to the Sun, or design the spacecraft's systems to counteract the small forces induced by solar drag.

Solar wind is a phenomenon characterized by the emission of charged particles, chiefly electrons and protons, from the outer layers of the Sun into space. Originating from the Sun's corona, the extreme temperatures cause these particles to attain high speeds, making it impossible for the Sun's gravitational pull to retain them. Hence, the particles escape into the cosmos. The composition of the solar wind primarily encompasses electrons and protons, with a smaller fraction being heavier ions like helium ions. These particles bear the Sun's magnetic field, known as the interplanetary magnetic field, along with them into space. The velocities of these particles range between 250 to 750 kilometers per second, while their density averages around 3 to 10 particles per cubic centimeter.

Robotic arms in spacecraft are controlled through a blend of pre-programmed commands, real-time control from astronauts or ground-based operators, and sometimes autonomous or semi-autonomous functionalities. Pre-programmed commands are often utilized based on the anticipated needs of the mission, and thoroughly tested on Earth before being deployed in space to execute specific tasks. Real-time control is facilitated through manual controls and computer interfaces, providing operators with the ability to make precise adjustments based on live feedback from cameras and sensors on the robotic arm and spacecraft. This real-time management is crucial for performing unanticipated or delicate tasks. Teleoperation, a form of real-time control, enables ground-based control systems to manage the robotic arm from afar, which is particularly useful for complex operations that can't be executed by astronauts or by onboard processing capabilities due to various constraints.

On the other hand, advanced robotic arms with autonomous or semi-autonomous systems can perform tasks with minimal to no human intervention, using sophisticated software, sensors, and cameras to interact with their environment and adjust to unexpected situations within predefined parameters. These autonomous systems significantly enhance the operational flexibility of robotic arms, especially in environments with delayed communication. Embedded feedback systems in the robotic arms provide real-time data on the arm's position, speed, and other critical parameters, ensuring the accuracy and safety of operations. Moreover, software interfaces play a pivotal role in the control of robotic arms, offering a user-friendly platform for operators to program, control, and monitor the arm's activities.

FIG. 1 illustrates an example Mobile Robotic Arm system 100 for momentum unloading, shown on a commercial communications satellite. Specifically, FIG. 1 shows Solar Pressure Reflective Panel 102 at Position A (102a) and Solar Pressure Reflective Panel 102 at Position B (102B). In some instances, the Solar Pressure Reflective Panel is a solar sail. Common materials used in their construction include Mylar, a type of polyester film known for its high tensile strength, chemical and dimensional stability, transparency, reflectivity, and electrical insulation properties. Aluminized polyimide films like Kapton are also utilized due to their excellent thermal, chemical, and radiation resistance, making them suitable for space applications. Additionally, thin aluminum films or aluminum coatings are often applied to create a highly reflective surface on the solar sail, which is crucial for maximizing the momentum transfer from sunlight.

For the structural components of solar sails, materials such as CP1 (Carbon Fiber Reinforced Plastic), known for its high strength-to-weight ratio, have been considered. This material can be used for the sail material itself or for constructing the booms and masts that hold the sail material taut. Other high-strength, lightweight materials like carbon fiber are also used for constructing booms and masts. Metallic foils may also be employed due to their reflectivity and lightweight properties.

FIG. 1 further depicts a Spacecraft Solar Wing 102. The term "solar wing" refers to the solar arrays or solar panels mounted on spacecraft or satellites. These solar wings are pivotal for capturing sunlight and converting it into electrical energy, which is then used to power the systems and instruments onboard the spacecraft or satellite. They are referred to as "wings" because they extend out from the body of the spacecraft, much like wings extend from the body of a bird or airplane. The design and deployment of solar wings are crucial for ensuring the spacecraft receives sufficient power throughout its mission. They are made of solar cells, usually photovoltaic cells, that are arranged in a way to maximize sunlight capture, often with mechanisms to track the sun as the spacecraft orbits.

Spacecraft Communications Antennas 106 are further depicted in FIG. 1. Communication antennas are indispensable components of spacecraft, enabling the exchange of data between the spacecraft and ground stations on Earth, as well as with other spacecraft or satellites. They come in various types, each serving different purposes based on their design. High-Gain Antennas (HGAs) are highly directional and capable of transmitting and receiving data over long distances, making them suitable for communications between Earth and interplanetary spacecraft. On the other hand, Low-Gain Antennas (LGAs) have a broader radiation pattern with a lower gain, useful for short-range communications or when the precise orientation of the spacecraft is unknown. Medium-Gain Antennas (MGAs) strike a balance between HGAs and LGAs in terms of directionality and gain. These antennas add to the solar pressure disturbances. They also must be avoided by the robotic arm. A mobile arm can easily avoid interfering with communications. These locations add constraints to the position and angles that can not be easily accommodated by a fixed system.

The operational frequency bands of spacecraft antennas, such as S-band, X-band, and Ka-band, are selected to accommodate different communication needs. Higher frequency bands like the Ka-band offer higher data rates, although they may be more susceptible to atmospheric interference. Phased Array Antennas are arrays of antennas with signals phased to reinforce or cancel each other in various directions, allowing for beam steering without mechanical movement. Omni-Directional Antennas, which radiate and receive signals equally well in all horizontal directions, are useful for initial acquisition and short-range communication. The frequencies will determine interference from the robot arm if the arm is moved in front of the reflector.

Also illustrated in FIG. 1 is Spacecraft Solar Wing Support 108/110. The arm cannot interfere with the motion of the solar wing.

The Robotic Arm 112 for the Reflective Panel 102 is also shown in FIG. 1. The robotic arm 112 may implement many aspects of the disclosed embodiments of the invention.

Figure 2:
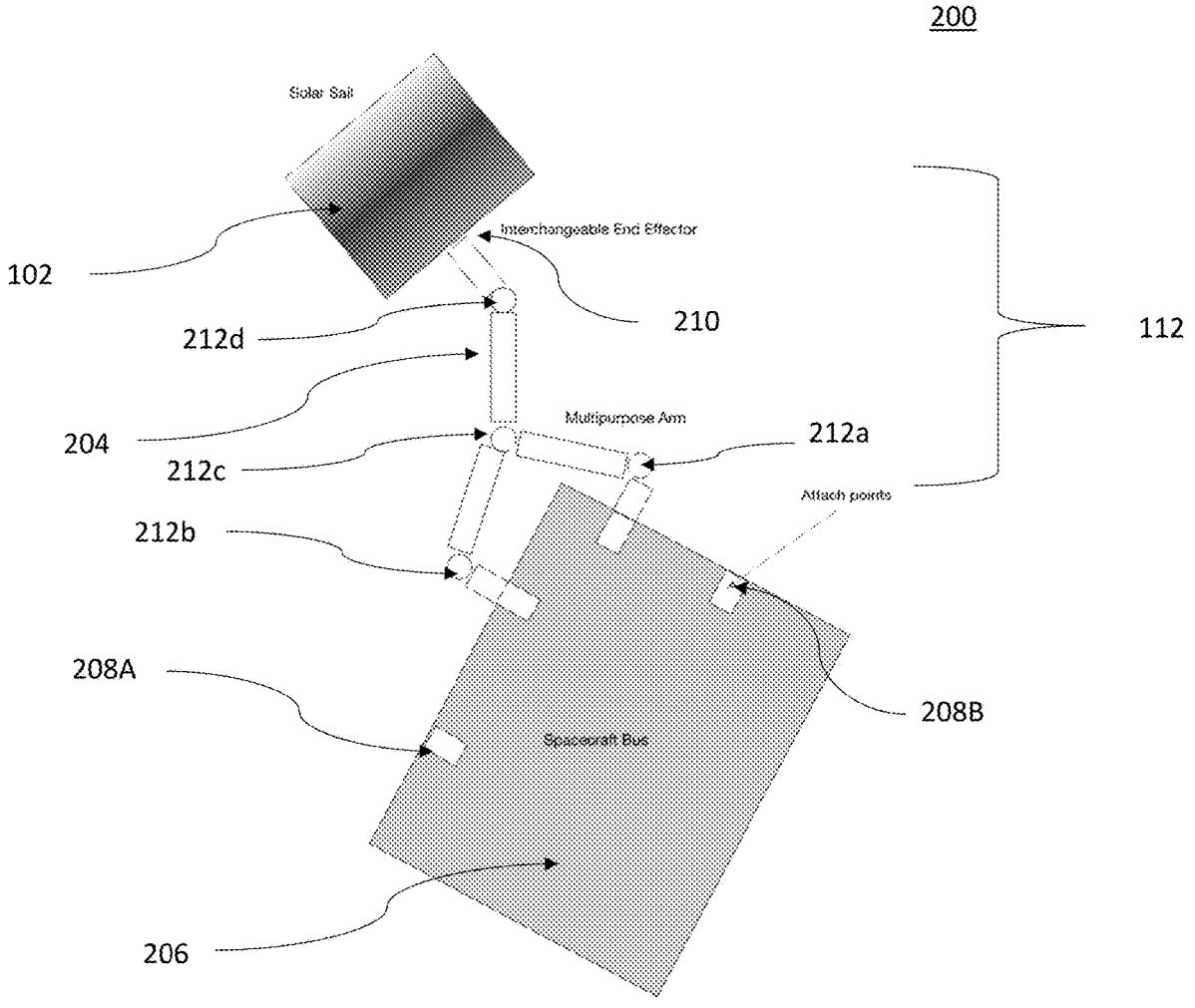
FIG. 2 depicts an example of the Mobile Robotic Arm's ability to move about a spacecraft.

FIG. 2 depicts an example of the ability of the robotic arm system 200 that allows a robotic arm to move about a spacecraft. The spacecraft has a series of latches to which the robot arm can attach (e.g., 208a and 208b). In many instances, each latch also provides power and/or communications. In some instances, attachment points 208A/208B are a plug with connections for power and communications. The robot arm moves by attaching the free end to one of these latches, and then releasing the latched end. This can be repeated in order to move the robotic arm to a desired position.

FIG. 2 further illustrates a Reflective Panel 102 is connected to a Robot arm link 204. The robot arm link is a structural part that connects joints (212a-212d), much like a person's forearm connects the elbow and wrist. Further, just like their human equivalent, these links have a maximum operating force, limited range of motion/position, and maximum amount of force that they can exert or receive. This limits the angular speed of the joints.

The robot arm link 204 is connected to the spacecraft bus 206. A spacecraft bus constitutes the supporting infrastructure and subsystems crucial for the functioning of a spacecraft, independent of its mission-specific payload. Essentially, it acts as the foundational platform upon which mission-centric instruments or payloads are mounted. The primary components of a spacecraft bus include the power subsystem, which consists of solar panels, batteries, and power distribution units, responsible for generating, storing, and distributing electrical power to the various systems and payloads aboard the spacecraft. The communications subsystem is another crucial component, encompassing antennas, transmitters, receivers, and data handling units that enable communication between the spacecraft, ground control, and potentially other spacecraft.

The propulsion subsystem is a part of the spacecraft bus, providing the necessary thrust to maneuver the spacecraft for trajectory corrections, station-keeping, or transitioning between orbits through engines, thrusters, and fuel storage tanks. Alongside, the thermal control subsystem plays a vital role in managing the spacecraft's temperature amidst the harsh thermal environment of space, utilizing radiators, heaters, insulating materials, and occasionally active cooling systems. The guidance, navigation, and control (GNC) subsystem ensures the correct orientation and trajectory of the spacecraft, employing sensors like star trackers and gyroscopes, and actuators like reaction wheels and thrusters for precise navigation and control.

The structural subsystem forms the skeletal framework of the spacecraft, holding all its components together, ensuring physical integrity and stability throughout the mission. Meanwhile, the command and data handling subsystem is pivotal for managing the collection, processing, storage, and transmission of data on the spacecraft. It also processes commands sent from ground control for the operation of the spacecraft and its instruments. Together, the spacecraft bus and the mission payload work in harmony to meet the objectives of the space mission.

FIG. 2 further illustrates an Interchangeable End Effector 210. The Interchangeable End Effector 210 is a device or tool attached to the end of a robotic arm designed to interact with the environment. It acts as the interface between the robot and its surroundings, enabling the robot to perform tasks as per its design. The functionality of end effectors is diverse, spanning from grippers used to grasp, hold, and release objects to welding torches for welding tasks in industrial settings. In some cases, the Interchangeable End Effector 210 is equipped with cameras, sensors, or other measuring devices to inspect or measure objects, adding a level of intelligence to the robot arm's operations.

In some instances, Interchangeable End Effector 210 can conform to the shape of the objects the robotic arm is interacting with. For example, the spacecraft may have multiple end effectors for different uses. In some instances, Interchangeable End Effector 210 is used to hold the reflective panel (e.g., panel 102). In other instances, Interchangeable End Effector 210 may be a manipulator hand for moving spacecraft hardware.

The Robotic Arm 112 includes the Interchangeable End Effector 210, the joints 212A-212d) and the arm link 204. Although the robotic arm 112 is depicted in four joints, the robotic arm 122 can include any number of joints.

Figure 3:
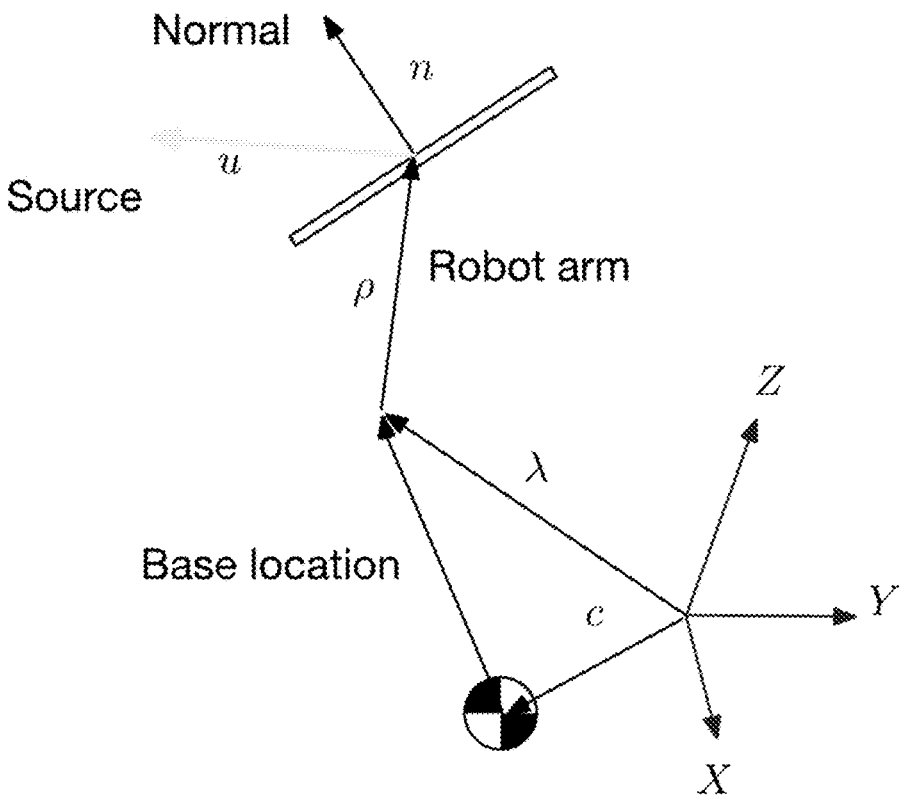
FIG. 3 illustrates an example geometry of the Mobile Robotic Arm system.

The geometry of the system is shown in FIG. 3. The base of the robot is located at a distance, $\lambda$-c from the origin. The panel is located at a distance p from the base. n is the panel normal, and u is the source direction. For solar pressure, this is the vector to the Sun. For drag, this is the velocity vector. The force produced by the sun is 4.5 micro N per square meter. In a 400 km earth orbit, the force produced by drag is 295 micro N per square meter.

Figure 4:
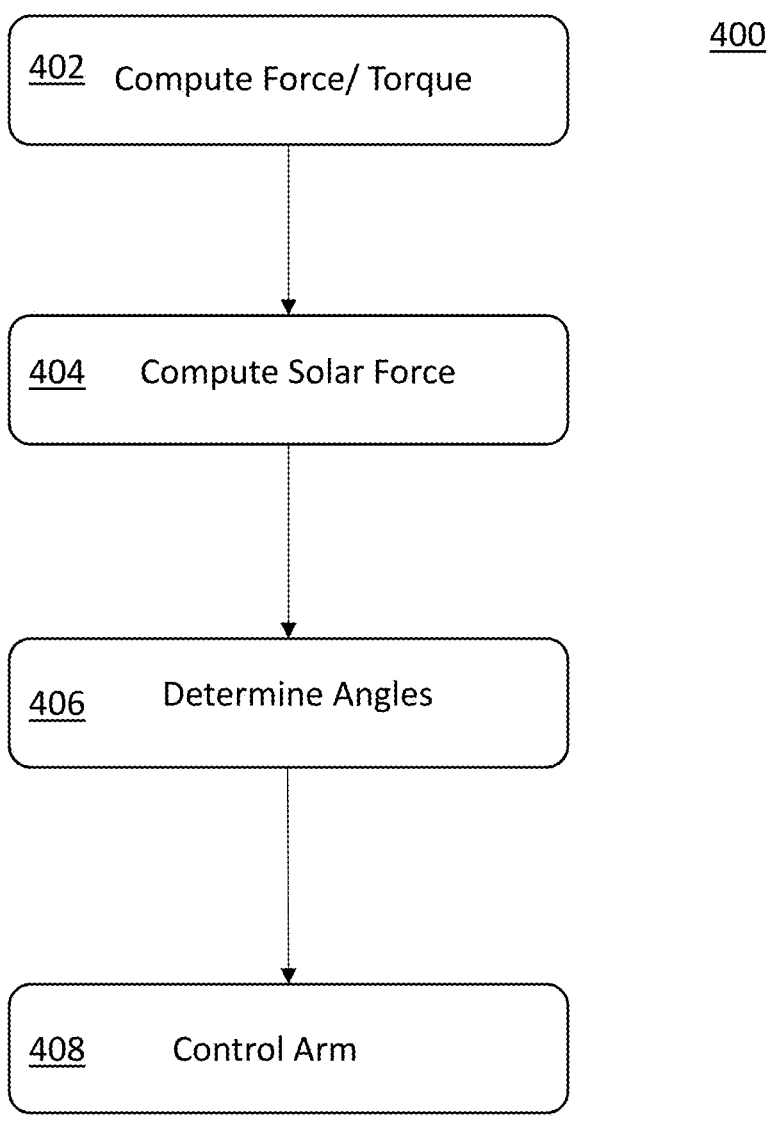
FIG. 4 illustrates an example method of controlling the robotic arm.

FIG. 4 depicts an example method 400 for controlling the robotic arm (e.g. In some instances, the optimal locations and joint angles are found by doing a search on the positions that produce the most force. The search may have to accommodate constraints to prevent the blocking of sensors or to accommodate other operational limits.

The optimization objective is to produce the force and torque required by the control system. This is further limited by other uses of the robot arm, so the arm may not always be available. This means or objective is that over time T, that the integral of the force and torque produced by the arm, will equal the integral of the torque and force demand. Time to move from one location to another must be factored in because during that time, the arm will not produce any forces or torques. In many instances, there are a total of 6 demand numbers, three for torque and three for force that must be met. One number is for each axis, x, y, z for position, and the angles about x, y, and z for rotation of the spacecraft. In some instances, the control system may require the panel to generate no net force and/or torque.

The primary constraints are the limitations in joint angles and positions for the arm. The spacecraft will have N plugs (e.g., attachment point 208A/208B) where the arm can be relocated. The secondary constraints are operational constraints, such as not blocking the field of view of a camera or antenna.

In some implementations, the optimization becomes a search. Starting with the current position and angles, find the minimal changes that meet the control objective. If a constraint is violated, then try a different direction for the search. The search algorithm has angles, that are continuous, but the positions are not so standard search algorithms will not work. This is a mixed integer and continuous control optimization problem.

Mixed Integer and Continuous Control (MICC) optimization problems are a specialized class of optimization problems that are encountered in various fields such as engineering, economics, and operations research. The core of these problems involves decision variables of two types, continuous and integer, alongside control variables. The objective in MICC problems is to optimize a certain goal, often expressed through a mathematical function, while navigating through both discrete decisions represented by integer variables and continuous control actions.

The structure of MICC problems is often delineated into several components. Firstly, there is an objective function that is aimed to be minimized or maximized, which can be linear, nonlinear, or even non-deterministic. Decision variables play a crucial role; continuous variables, which can assume any real value within a defined range, and integer variables, which can only take integer values, often representing discrete decisions such as the number of items to buy or machines to operate. Control variables signify the actions one can take to influence system dynamics. They might be either continuous or discrete and play a part in how the system evolves over time. Constraints are another fundamental aspect of MICC problems; they are the restrictions or limitations imposed on decision variables, which could manifest as equations or inequalities that must be satisfied in any feasible solution.

Optimization techniques for solving MICC problems must address the complex interaction between discrete decisions and continuous control actions, alongside system dynamics. Common methodologies employed include branch-and-bound methods, mixed-integer linear programming (MILP), mixed-integer nonlinear programming (MINLP), and hybrid algorithms that amalgamate continuous and discrete optimization techniques. The primary challenge in MICC optimization lies in efficiently traversing the discrete decision space while also optimizing the continuous control actions, adhering to the system dynamics and constraints. This scenario often necessitates the use of sophisticated optimization techniques or heuristics to arrive at satisfactory solutions within a reasonable timeframe.

In step 402, the torque and force demand is computed from the control system. Demands are the forces and torques that the system must produce to meet the demand from the control system for positioning the spacecraft. For example, a specific amount of torque may be required to reorient the spacecraft toward a target. In another example, the spacecraft may require a certain amount of torque to deploy a payload or unfurl additional solar panels.

In many instances, the joint angles and positions will determine the torque produced by the panel. For example, a joint angle of zero may be defined as the angle with the sun vector that is perpendicular to the panel. If the angle is 90 degrees, the force is zero. In this example, if the joint angle is 45 degrees, then the force is 70% of the peak.

In some instances, the control system implements a Proportional Integral Differential (PID) controller. A PID controller, standing for Proportional, Integral, and Derivative, is a type of control system used to automatically adjust a control variable to achieve a desired set point. The proportional term (P) reacts to the present error, adjusting the control variable proportionally to the error based on a proportional gain. Larger gains result in larger adjustments, making the system respond quicker, but may also cause overshoot. The integral term (I) accounts for past errors over time, aiding in eliminating any steady-state error that might remain after the proportional control action. By summing up past errors, it provides a corrective action that adjusts the system to achieve the set point accurately over time.

The derivative term (D) considers the rate of change of the error, essentially predicting the future behavior of the error, and applies a corrective action accordingly. This term adds a damping effect which can smooth out the system response and help to minimize overshoot. The combined action of these three terms makes up the control signal which adjusts the process to minimize the error, reaching and maintaining the desired set point. The mathematical expression for a PID controller is given as $u(t)=K_p e(t)+K_i\int e(t),\, dt+K_d\frac{d e(t)}{dt}$, where $(u(t))$ is the controller output, $(K_p, K_i, K_d)$ are the proportional, integral, and derivative gains respectively, and $(e(t))$ is the error signal at time $(t)$. Tuning a PID controller entails fine-tuning the $(K_p, K_i,)$ and $(K_d)$ gains to achieve a desirable system response, balancing between quick response and minimal overshoot with steady-state error reduction.

In other instances, the control system implements Lyapunov functions. Lyapunov functions play a pivotal role in control theory, aiding in the analysis of stability for dynamical systems. A Lyapunov function is a scalar function $V: \mathbb{R}^n \rightarrow \mathbb{R}$ defined over the state space of a system, designed to exhibit properties akin to potential energy in physical systems. For a specified equilibrium point$(x_e)$, the Lyapunov function $V(x)$ should be continuous, differentiable, and positive definite around $(x_e)$, meaning $(V(x)>0)$ for $(x\neq x_e)$ and $(V(x_e)=0)$. The core idea behind Lyapunov functions is akin to analyzing the system's energy behavior-if the "energy" continually decreases and reaches zero at the equilibrium point, then the system is deemed stable at that point.

Lyapunov's Direct Method is a principal methodology used to analyze system stability utilizing Lyapunov functions, without requiring a solution to the system's differential equations. By studying the time derivative of the Lyapunov function along the system's trajectories, stability characteristics of the equilibrium points are inferred. If $\dot{V}(x)$ is negative definite (i.e., $\dot{V}(x)<0$ for $x\neq x_e$), the equilibrium point $x_e$ is considered asymptotically stable. If $\dot{V}(x) \leq 0$ for all $x$, then the equilibrium point $x_e$ is deemed stable in the Lyapunov sense. On the flip side, if there exists a region around $x_e$ where $\dot{V}(x)>0$, the equilibrium point $x_e$ is assessed as unstable. Through the lens of Lyapunov-based analysis, control engineers can design controllers and thereby ensure system stability, a crucial aspect in the realm of control systems.

In other instances, similar algorithms are utilized by the control system to determine the torque and force required to meet the robot arms objectives.

Next in step 404, the external solar force and/or aerodynamic force is computed. This force determines the magnitude of the torque that can be produced by the panel. The direction of the torque is determined by the angles of the panel with respect to the sun. An equation for the aerodynamic force is one-half the atmospheric density multiplied by the drag coefficient multiplied by the area of the panel which is then multiplied by the square of the spacecraft velocity. The direction is along the velocity vector. Solar pressure force is the solar flux, typically 1367 Watts, divided by the speed of light in a vacuum. The solar pressure force produced is 4.5 micro N per square meter. In a 400 km earth orbit, the force produced by drag is 295 micro N per square meter. These values are based on a spacecraft at the distance of the Earth from the sun. The solar force drops as 1 divided by the distance from the sun squared. The aerodynamic force is dependent on the altitude, also known as the orientation. The atmospheric density is an exponential function of altitude.

In step 406, the optimal joint angles and locations are determined that produce the desired force and torque calculated in step 402. In many instances, the optimal angles and positions will be those that minimize angular and positional movement and meet any other constraints. Constraints are ranges of angles and positions that cannot be used because they would interfere with the spacecraft's operation. These constraints, plus the limits on the angles each joint can have, make the optimization more challenging. The optimization includes the location of the arm, which again is limited by the locations of the plugs (e.g., attachment point 208A/208B) and operational constraints (e.g., positioning of sensors).

In instances where the solar pressure cannot produce enough force, a backup system, typically using thrusters, would be employed. In these instances, the optimal position joint angles would be recalculated based on the additional source of the force and/or torque. In some instances, when the backup systems are utilized for thrust, the optimal position may be to completely retract the panel.

In some instances, the optimal joint angles and locations are determined using the Downhill Simplex method. The Downhill Simplex method, also known as the Nelder-Mead method, is a commonly used optimization technique for finding the minimum of a function. It's a direct search method, meaning it doesn't require the gradient of the function to perform the optimization. This makes it suitable for functions that are discontinuous or not differentiable. It is susceptible to falling into local minimums. The method is termed "downhill" as it's utilized to locate the minimum point in a multi-dimensional space. The term 'simplex' refers to a polytope of n+1 vertices in n dimensions.

In other instances, the optimization is performed using genetic algorithms and/or any one of many optimization processes. Genetic Algorithms (GAs) are a class of evolutionary algorithms inspired by natural selection, aiming to solve optimization and search problems. Initially, a population of potential solutions is generated either randomly or based on a heuristic. Each solution, encoded as a string or chromosome of bits, characters, or numbers, represents a possible solution to the problem at hand. A fitness function is employed to evaluate the closeness of these solutions to the optimum, quantifying their suitability. The fitness values guide the selection process, where individuals are chosen to be parents based on their fitness scores, with better solutions having a higher chance of being selected. Common selection strategies include roulette wheel selection, tournament selection, and elitism.

The crossover, or recombination, stage follows selection, where pairs of individuals (parents) are mated to produce one or more offspring. Various crossover operations combine the genetic information of the parents with the hope of generating superior offspring. Mutation then comes into play, altering some genes in the offspring's chromosomes randomly to introduce new genetic structures into the population. Subsequently, the replacement step may see the addition of new individuals to the population, and potentially the removal of some less fit individuals. The algorithm iterates through the processes of selection, crossover, mutation, and replacement for a set number of generations, or until a termination criterion, such as a satisfactory solution, a fixed number of generations, or population convergence, is met. Through these iterative processes, Genetic Algorithms navigate through the solution space, often arriving at highly effective approximations to the optimum solution.

In some instances, the optimal joint angles and locations are in a retracted position. In the retracted position, the solar sail generates zero net force/torque. In some cases, the optimal joint angles and locations are further determined based on the current position of the robot arm and the respective joints that comprise the robotic arm. For example, the optimal joint angles and locations may be selected to minimize the force experienced by the panel while the robotic arm is moving from one plug to another. The path needs to be chosen to incorporate operational constraints, which may vary during the operation of the space vehicle.

In step 408, the robotic arm is positioned according to the values determined in step 406. In positioning the robotic arm, both the angles of the joints that comprise the robotic arm and the location of the arm base are considered. These factors and the center-of-mass of the spacecraft determine the torque. The force is independent of the center of mass.

In many instances, the robotic arm is positioned through actuators. Actuators function as the "muscles" for the robotic arm and provide the necessary movement and interaction capabilities. They operate by converting energy, usually electrical, into mechanical motion, with common types being electric motors, hydraulic pistons, or pneumatic cylinders. In robotic arms, actuators control the motion in terms of both rotation and extension, with the precision and range of this motion being governed by the actuator's design and the control system orchestrating it. They are also tasked with generating the requisite force to move the robotic arm and, by extension, manipulate objects. The amount of force an actuator can exert is dependent on its design and the energy source propelling it. The actuator's directional control is crucial; linear actuators facilitate straight-line motion, rotary actuators yield rotational motion, and multi-axis actuators control motion in multiple directions for more complex movements.

Various types of actuators are implemented to fulfill different operational requirements. One of the most common types is electric actuators, utilized widely due to their precise control, high efficiency, and seamless integration with control systems. They operate mainly through electric motors, such as DC motors for continuous rotation and speed control, Servo motors for precise positioning, Stepper motors for controlled rotational steps, and Linear motors for direct linear motion. On the other hand, hydraulic actuators are utilized for their high force output and robustness, which are essential in heavy-duty robotic applications. They operate by utilizing incompressible fluids to generate motion, necessitating a hydraulic pump and a system of valves for effective operation.

In some instances, pneumatic actuators may be utilized. Pneumatic actuators operate using compressed air to create motion and offer a simpler, cleaner, and faster solution, albeit with less precision and power compared to hydraulic actuators. For micro and nano-scale movements, piezoelectric actuators are preferred owing to their extremely precise motion capabilities derived from the piezoelectric effect. Shape Memory Alloy (SMA) actuators, leveraging alloys that change shape with temperature variations, are employed in specialized robotic applications requiring compact size and silent operation. Additionally, magnetic actuators, operating through magnetic fields, and ultrasonic motors, driven by ultrasonic vibrations, provide unique solutions for generating motion for the control of a robotic arm.

The methods provided can be implemented in a general-purpose computer, a processor, or a processor core. Suitable processors include, by way of example, a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media, such as CD-ROM disks and digital versatile disks (DVDs).

What is claimed is:

1. A method for controlling a spacecraft, the method comprising:
(a) determining, by an onboard controller, a resultant force and/or torque required to achieve a commanded change in at least one of attitude or orbital position of the spacecraft;
(b) computing, from ephemeris and current-attitude data, a vector quantity representing an amount of solar force available at the spacecraft location;
(c) selecting, by solving a constrained mixed-integer optimization, (i) an attachment point chosen from a plurality of mechanically and electrically compatible attachment points distributed over an exterior surface of the spacecraft and (ii) a location and orientation for a solar sail such that, when the solar sail is held at the location, a component of the solar force is a vector substantially equals the resultant force and/or torque while maintaining line-of-sight clearance for every spacecraft antenna or sensor;
(d) determining, from the optimization, a set of joint angles defining a position for a multi-joint robotic arm that is required to hold the solar sail at the selected attachment point;
(e) controlling the multi-joint robotic arm to move to the position by alternately latching a free end effector of the multi-joint robotic arm to the selected attachment point and unlatching a previously latched end effector, thereby walking the multi-joint robotic arm along the exterior surface; and
(f) when the amount of solar force available is insufficient to achieve the resultant force and/or torque, commanding an onboard thruster to supplement the solar force and retracting the solar sail to a stowed configuration that produces substantially zero net solar force.

2. The method of claim 1, wherein the position of the multi-joint robotic arm includes a location of an attachment point among the plurality of attachment points on the spacecraft, and the robotic arm latches to the attachment point.

3. The method of claim 2, wherein the multi-joint robotic arm moves to the position by attaching a free end of the multi-joint robotic arm to one of the plurality of attachment points and then releasing a previously latched end of the multi-joint robotic arm from another attachment point among the plurality of attachment points.

4. The method of claim 1, further comprising:
when the amount of the solar force available is less than the resultant force and/or torque required, controlling a thruster to provide an additional force.

5. The method of claim 4, wherein the location for the solar sail is further determined based on the additional force.

6. The method of claim 5, wherein the location is a retracted position in which the solar sail generates substantially zero net force.

7. The method of claim 4, wherein the position for the multi-joint robotic arm required to hold the solar sail is further determined based on the additional force.

8. A system for controlling a spacecraft, the system comprising:
a solar sail having a reflective panel;
a robotic arm comprising a plurality of rotary joints and at least first and second end effectors, each end effector being configured to latch selectively to any of a plurality of attachment points disposed on an exterior surface of the spacecraft; and
one or more processors configured to execute instructions that cause the processors to:
(i) determine an amount of solar force available based on a position of the spacecraft;
(ii) determine a location for the solar sail to provide a resultant force and/or torque required to position the spacecraft based on the amount of the solar force available;
(iii) determine a position for the robotic arm required to hold the solar sail at the location; and
(iv) control the robotic arm to move to the position by alternately latching the end effectors to the attachment points.

9. The system of claim 8, wherein the position of the robotic arm includes a location of one of the plurality of attachment points and the robotic arm latches to the attachment point.

10. The system of claim 9, wherein the robotic arm moves to the position by attaching a free end effector of the robotic arm to one of the plurality of attachment points, and then releasing a previously latched end effector from another attachment point among the plurality of attachment points.

11. The system of claim 8, wherein the one or more processors are further configured to:
when the amount of the solar force available is less than the resultant force and/or torque required, control a thruster to provide an additional force.

12. The system of claim 11, wherein the location for the solar sail is further determined based on the additional force.

13. The system of claim 12, wherein the location is a retracted position in which the solar sail generates substantially zero net force.

14. The system of claim 11, wherein the position for the robotic arm required to hold the solar sail is further determined based on the additional force.

15. A non-transitory computer readable storage medium storing instructions for controlling a spacecraft, the instructions when executed by a processor cause the processor to execute a method, the method comprising:

(a) determining, by an onboard controller, a resultant force and/or torque required to achieve a commanded change in at least one of attitude or orbital position of the spacecraft;

(b) computing, from ephemeris and current-attitude data, a vector quantity representing an amount of solar force available at the spacecraft location;

(c) selecting, by solving a constrained mixed-integer optimization, (i) an attachment point chosen from a plurality of mechanically and electrically compatible attachment points distributed over an exterior surface of the spacecraft and (ii) a location and orientation for a solar sail such that, when the solar sail is held at the location, a component of the solar force is a vector substantially equals the resultant force and/or torque while maintaining line-of-sight clearance for every spacecraft antenna or sensor;

(d) determining, from the optimization, a set of joint angles defining a position for a multi-joint robotic arm that is required to hold the solar sail at the selected attachment point;

(e) controlling the multi-joint robotic arm to move to the position by alternately latching a free end effector of the multi-joint robotic arm to the selected attachment point and unlatching a previously latched end effector, thereby walking the multi-joint robotic arm along the exterior surface; and (f) when the amount of solar force available is insufficient to achieve the resultant force and/or torque, commanding an onboard thruster to supplement the solar force and retracting the solar sail to a stowed configuration that produces substantially zero net solar force.

16. The non-transitory computer readable storage medium of claim 15, wherein the position of the multi-joint robotic arm includes a location of an attachment point among a plurality of attachment points on the spacecraft, and the robotic arm latches to the attachment point.

17. The non-transitory computer readable storage medium of claim 16, wherein the multi-joint robotic arm moves to the position by attaching a free end effector of the multi-joint robotic arm to one of the plurality of attachment points latches, and then releasing a previously latched end effector from another attachment point among the plurality of attachment points.

18. The non-transitory computer readable storage medium of claim 16, wherein the instructions further cause the processor to, when the amount of the solar force available is less than the resultant force and/or torque required, control a thruster to provide an additional force.

19. The non-transitory computer readable storage medium of claim 18, wherein the location for the solar sail is further determined based on the additional force.

20. The non-transitory computer readable storage medium of claim 18, wherein the position for the multi-joint robotic arm required to hold the solar sail is further determined based on the additional force.

* * * * *